US005589149A

United States Patent [19]

Garland et al.

[11] Patent Number: 5,589,149

[45] Date of Patent: Dec. 31, 1996

[54] PROCESS FOR ABSORPTION OF MERCAPTANS

[75] Inventors: Paul Garland, Aylesbury, United Kingdom; Craig N. Schubert; Richard A. Gregory, both of Belle Mead, N.J.; Eduardo Garcia-Rameau; Rickey Epps, both of Houston, Tex.; David Burns; Robert J. Hlozek, both of The Woodlands, Tex.

[73] Assignee: Union Carbide Chemicals & Plastics Technology Corporation, Danbury, Conn.

[21] Appl. No.: 501,702

[22] Filed: Jul. 12, 1995

Related U.S. Application Data

[63] Continuation of Ser. No. 149,077, Nov. 9, 1993, abandoned.

[51] Int. Cl.[6] .................... B01D 53/48

[52] U.S. Cl. .................... 423/242.4; 423/242.7; 423/229

[58] Field of Search .................... 423/242.4, 242.7, 423/226, 228, 229

[56] References Cited

U.S. PATENT DOCUMENTS

| | | | |
|---|---|---|---|
| 2,600,328 | 6/1952 | Riesenfeld et al. | 423/228 |
| 3,681,015 | 8/1972 | Gelbein et al. | 23/2 R |
| 3,716,620 | 2/1973 | Deschamps et al. | 423/228 |
| 3,856,921 | 12/1974 | Shrier et al. | 423/242.4 |
| 4,020,144 | 4/1977 | Bosniak | 423/226 |
| 4,044,100 | 8/1977 | McElroy, Jr. | 423/226 |
| 4,145,192 | 3/1979 | Beise et al. | 423/226 |
| 4,330,305 | 5/1982 | Kuessner et al. | 55/48 |
| 4,529,411 | 7/1985 | Goddin et al. | 62/24 |
| 4,581,154 | 4/1986 | Kutsher et al. | 252/170 |
| 4,705,673 | 11/1987 | Capobianco et al. | 423/229 |
| 4,741,745 | 5/1988 | Kadono et al. | 55/43 |
| 5,104,630 | 4/1992 | Holmes et al. | 423/228 |

FOREIGN PATENT DOCUMENTS

| | | | |
|---|---|---|---|
| 0452694 | 10/1991 | European Pat. Off. . | |
| 3922904 | 1/1991 | Germany . | |
| 50-15782 | 2/1975 | Japan | 423/242.7 |
| 52-62307 | 5/1977 | Japan | 423/229 |
| 927282 | 5/1982 | U.S.S.R. | 423/229 |

*Primary Examiner*—Steven Bos
*Assistant Examiner*—Peter T. DiMauro
*Attorney, Agent, or Firm*—J. B. Mauro

[57] ABSTRACT

Absorption solvents for removing mercaptans from gas streams are disclosed. The absorption solvents comprise an alkylether of a polyalkylene glycol, e.g., methoxytriglycol, and a secondary monoalkanolamine, e.g., N-methylethanolamine, as well as optionally other amines, e.g., methyldiethanolamine and diethanolamine. The absorption solvents do not require the presence of iodine for removal of mercaptans. Absorption processes utilizing the solvents are also disclosed.

14 Claims, 1 Drawing Sheet

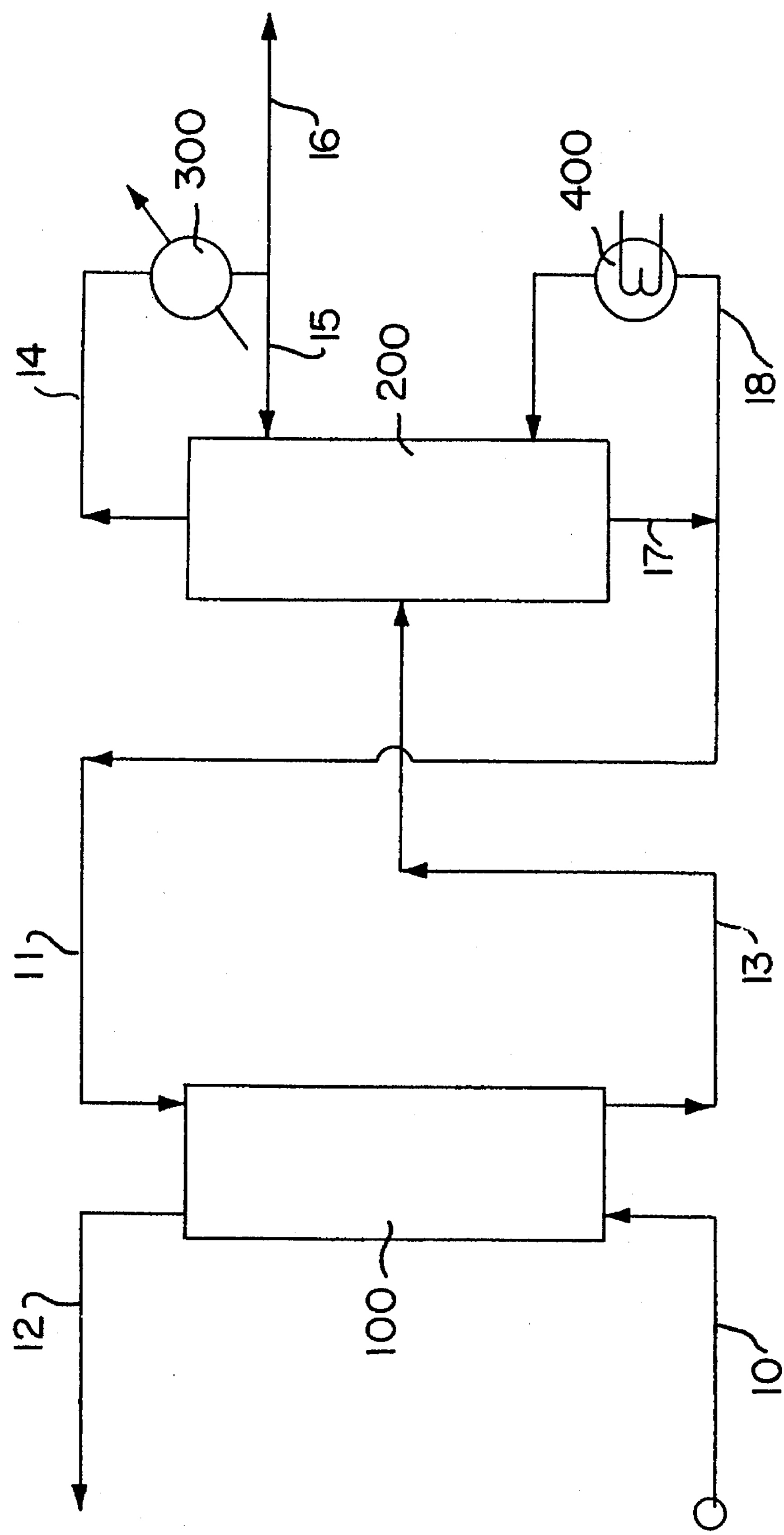
300
16
400
15
14
200
18
17
11
13
12
100
10

PROCESS FOR ABSORPTION OF MERCAPTANS

This application is a Continuation of prior U.S. application Ser. No. 08/199,077, now Nov. 9, 1993, now abandoned.

FILED OF THE INVENTION

The present invention relates to the removal of mercaptans from gas streams. More specifically, the present invention relates to processes and solvents for removing mercaptans from gas streams by absorption.

BACKGROUND OF THE INVENTION

It is often desirable to remove acid gases, such as, for example, $CO_2$, $H_2S$, $SO_2$, $CS_2$, HCN, COS, and sulfur derivatives of $C_1$ to $C_8$ hydrocarbons, from gas streams. Gas streams from which these acid gases must be removed can be from many sources. One common source of such gas streams is from natural gas wells. The gas removed from natural gas wells is often rich in methane and other combustible gases, but contains concentrations of acid gases such as $H_2S$, $CO_2$ and the other acid gases described above. High concentrations of $H_2S$ inhibit pipe line shipment of the natural gas because of environmental considerations and government regulation. High concentrations of $CO_2$ in natural gas reduce the heating value of the gas because $CO_2$ is not combustible. Mercpatans, i.e., sulfur derivatives of $C_1$ to $C_8$ hydrocarbons, have an offensive odor and are corrosive.

The removal of mercaptans can be particularly difficult. One process proposed for the removal of mercaptans from a gas stream is described in U.S. Pat. No. 3, 716,620, issued Feb. 13, 1973. The process includes the step of contacting a gas containing hydrogen sulfide or a mercaptan with a solution of iodine in an organic solvent, e.g., an ether of a polyalkylene glycol, and an amine. The presence of iodine in processes such as described in the above-referenced patent is generally undesirable because the iodine must be regenerated in an oxidation process which increases the complexity and adds cost to the overall acid gas removal process.

Accordingly, processes and absorption solvents are desired for the removal of mercaptans from gas streams by absorption which do not require the presence of iodine or suffer the disadvantages described above.

SUMMARY OF THE INVENTION

In accordance with the present invention, improved processes and absorption solvents are provided for the removal of mercaptans from gas streams. The absorption solvents utilized in the processes are highly effective for the absorption of mercaptans at low solvent circulation rates. The absorption solvent comprises:

(i) from about 10 to 98 weight percent based on the weight of the absorption solvent on an anhydrous basis, i.e., excluding water, of an alkyl ether of a polyethylene glycol of the formula:

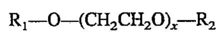

$$R_1—O—(CH_2CH_2O)_x—R_2$$

wherein:

$R_1$ is an alkyl group having 1 to about 4 carbon atoms;

$R_2$ is hydrogen or an alkyl group having 1 to about 4 carbon atoms; and x is 1 to about 10; and (ii) from 1 to about 20 weight percent based on the weight of the absorption solvent on an anhydrous basis of a secondary monoalkanol amine of the formula:

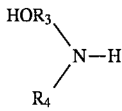

wherein;

$R_3$ is an alkyl group having 1 to about 6 carbon atoms; and $R_4$ is an alkyl group having 1 to about 4 carbon atoms.

In addition the solvent may contain from about 0.1 to 80 weight percent water based on the total weight of the absorption solvent, and optionally other amines such as, for example, dialkanol amines. The absorption solvent is further characterized by having less than 0.005 moles of iodine per liter of absorption solvent.

By virtue of the present invention, it is now possible to remove mercaptans from gas streams using a solvent containing an alkyl ether of a polyethylene glycol and a secondary monoalkanolamine without the use of iodine. As a result, the processes of the present invention can offer the following advantages, for example, over a process which requires the presence of iodine: no oxidative regeneration step is required to reuse the iodine, thereby reducing the complexity and cost of the process; and solids formation caused by the reaction of hydrogen sulfide with iodine to form sulfur is eliminated thereby reducing fouling of equipment surfaces.

BRIEF DESCRIPTION OF THE DRAWINGS

FIG. 1 illustrates a process flow diagram of an absorption process in accordance with the present invention.

DETAILED DESCRIPTION OF THE INVENTION

The alkyl ether of the polyalkylene glycol of the present invention has the formula

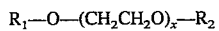

$$R_1—O—(CH_2CH_2O)_x—R_2$$

wherein:

$R_1$ is an alkyl group having 1 to about 4 carbon atoms;

$R_2$ is hydrogen or an alkyl group having 1 to about 4 carbon atoms; and x is 1 to about 10.

$R_1$ is preferably $CH_3$, $C_2H_5$ or $C_3H_7$, and more preferably $CH_3$. X is preferably 2 to 8, more preferably 2 to 4 and most preferably 3. In one aspect of the invention, $R_2$ is hydrogen. In another aspect of the invention $R_2$ is preferably $CH_3$, $C_2H_5$ or $C_3H_7$.

When $R_2$ is hydrogen, typical compounds within the formula described above include, for example, methoxytriglycol, methoxytetraglycol, butoxytriglycol, ethoxytriglycol, methoxydiglycol, and butoxydiglycol.

When $R_2$ is an alkyl group, typical compounds within the formula described above, include, for example, diethylene glycol diisopropyl ether, triethylene glycol diisopropyl ether, tetraethylene glycol diisopropyl ether, polyethylene glycol dimethyl ether, polyethylene glycol methyl isopropyl ether, polyethylene glycol methyl tertbutyl ether and propylene carbonate.

Methoxytriglycol and polyethylene glycol dimethyl ether are preferred alkyl ethers of polyethylene glycols for use in accordance with the present invention.

Methods for preparing alkyl ethers of polyethylene glycol suitable for use in accordance with the present invention are known to those skilled fix art. Alternatively, such compounds are available, for example, from Union Carbide Corporation, Danbury, Conn.

Typically, the alkyl ether of the polyethylene glycol will comprise from about 10 to 98 weight percent of the absorption solvent based on the weight of the absorption solvent on an anhydrous basis. Preferably, the alkyl ether of the polyethylene glycol absorption solvent will comprise from about 20 to 95 weight percent, and more preferably from about 30 to 90 weight percent of the absorption solvent based on the weight of the absorption solvent on an anhydrous basis. Typically when $R_2$ is hydrogen, the alkyl ether of the polyethylene glycol will range from about 30 to 60 weight percent of the absorption based on the weight of the absorption solvent on an anhydrous basis. Typically when $R_2$ is an alkyl group, the alkyl ether of the polyethylene glycol will range from about 50 to 90 weight percent of the absorption solvent based on the weight of the absorption solvent on an anhydrous basis.

The secondary monoalkanol mine of the present invention has the formula

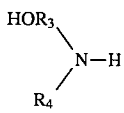

wherein;

$R_3$ is an alkyl group having 1 to about 6 carbon atoms; and $R_4$ is an alkyl group having 1 to about 4 carbon atoms.

$R_3$ is preferably $CH_2$,$C_2H_4$ or $C_3H_6$, and more preferably, $C_2H_4$.

$R_4$ is preferably $CH_3C_2H_5$ or $C_3H_7$, and more preferably, $CH_3$.

Typical amines included within the above formula include, for example, N-methylethanolamine and N-ethylethanolamine. A preferred secondary monoalkanolamine for use in accordance with the present invention is N-methyethanolamine.

Typically, the secondary monoalkanolamine will be present in the absorption solvent in an amount from about 1 to 20 weight percent based on the weight of the absorption solvent on an anhydrous basis. Preferably, the absorption solvent will contain from about 1 to 15 weight percent, and more preferably from about 2 to 10 weight percent, of a secondary monoalkanolamine based on the weight of the absorption solvent on an anhydrous basis.

Other amines can also be included in the absorption solvents of the present invention. Preferably, such other amines are secondary or tertiary dialkanolamines such as, for example, methyldiethanolamine, ethyldiethanolamine, methylethanolpropanolamine, ethylethanolpropanolamine, and methyldipropanolamine. Trialkanolamines, such as, for example, triethanolamine may also be used in the absorption solvents of the present invention. When such dialkanol and trialkanol amines are employed, their concentration is preferably from about 10 to 60 weight percent, and more preferably from about 20 to 50 weight percent, based on the weight of the absorption solvent on an anhydrous basis.

In a preferred aspect of the invention, the absorption solvents preferably comprise from about 10 to 50 weight percent, and more preferably from about 10 to 40 weight percent, of diethanolamine based on the weight of absorption solvent on an anhydrous basis. It is also preferred that the absorption solvents comprise from about 5 to 20 weight percent, and more preferably from about 10 to 20 weight percent, of methyldiethanolamine based on the weight of absorption solvent on an anhydrous basis.

Methods for preparing the above,described amines are known to those skilled in the art. Alternatively, such amines are commercially available such as, for example, from Union Carbide Corporation, Danbury, Conn.

The absorption solvents of the present invention are typically aqueous-based and often comprise from about 0.1 to 80 weight percent water based on the total weight of the absorption solvent, i.e., including water. Preferably, the absorption solvents of the present invention comprise from about 1 to 50 weight percent water based on the total weight of the absorption solvent. Often, the water concentration ranges from about 1 to 30 weight percent, is occasionally is less than 20 percent and is sometimes from about 1 to 15 weight percent based on the total weight of the absorption solvent. Appropriate water concentrations for the particular process conditions, feed gas components, and the like, can be determined by those skilled in the art.

Often, the absorption solvents of the present invention will additionally contain additives such as, for example, corrosion inhibitors, defoamers, and the like. Typically, the concentration of such additives will range from about 0.01 to 5 weight percent based on the weight of the absorption solvent on an anhydrous basis. Further details concerning such additives are known to those skilled in the art.

Quite surprisingly, it has been found in accordance with the present invention that the above-described absorption solvents have capacity and selectivity for mercaptans without requiring the presence of iodine. Preferably, the amount of iodine in the absorption solvents of the present invention is less than about 0.005 moles of iodine per liter of absorption solvent and more preferably, less than 0.001 moles of iodine per liter of absorption solvent. Most preferably, there is an essential absence of iodine, i.e., less than about 100 parts per million on a volume basis.

Essentially any feed gas containing mercaptans can be used in the processes of the present invention. Typically, however, the feed gas streams will contain mercaptans having from 1 to about 8, preferably 1 to about 4, carbon atoms, $CO_2$, $H_2S$, COS, hydrocarbons having from about 1 to 4 carbon atoms, e.g. methane to butane, and water. It is not uncommon for the feed gas streams to also contain $SO_2$, $SO_3$, $CS_2$, HCN, oxygen and nitrogen. Typically, the mercaptans will be present in an amount from about 10 to 10,000 $ppm_v$, often from about 10 to 2,000 $ppm_v$. $H_2S$ is typically present in a concentration of from about 0 to 90 mole percent, often from about 4 $ppm_v$ to about 50 mole percent. $CO_2$ is typically present in an amount of from about 0 to 50 mole percent often from about 10 to 30 mole percent. COS, when present, will typically comprise from about 2 to 10,000 $ppm_v$. The hydrocarbons having from 1 to about 4 carbon atoms per molecule are typically present in an amount of from about 10 to 98 mole percent. The sources of such feed streams are not critical to the present invention but include, for example, natural gas wells, refinery coker off-gas, refinery fluid catalytic cracker off-gas and other refinery gas streams.

The invention is hereafter described with reference to FIG. 1 which illustrates a process flow diagram in accordance with the present invention. The process flow diagram is provided for illustrative purposes and is not intended to limit the scope of the claims which follow. Those skilled in the art will recognize that the process flow diagram does not illustrate various common pieces of process equipment such as, for example, heat exchangers, pumps, compressors, heaters, process control systems and the like.

A feed gas stream containing 93 mole percent methane, 3 mole percent ethane, 1 mole percent propane, 1 mole percent $CO_2$, mole percent $H_2S$, 13 milligrams per cubic meter (13 mg/$m^3$) of methyl mercaptan, 108 mg/$m^3$ of ethyl mercaptan, 83 mg/$m^3$ propyl mercaptan and 45 mg/$m^3$ butyl mercaptan were introduced to absorption zone 100 via line 10. Absorption zone 100 comprises a gasliquid contacting tower containing suitable trays or packing material to conduct an absorption process. The details concerning the apparatus used in the absorption zone are known to those skilled in the art. The absorption zone is typically operated at a temperature of from about 25 to 90° C. and a pressure of from about 100 to 7000 kilopascals.

In absorption zone 100, the feed gas stream is contacted with a lean solvent stream introduced via line 11. The lean solvent stream comprises an absorption solvent containing 50 weight percent methoxytriglycol, 5 weight percent N-methylethylamine, 30 weight percent diethanollamine and 15 weight percent methyldiethanolamine based on the weight of the absorption solvent on anhydrous basis. The absorption solvent also contained about 38 weight percent water based on the total weight of the absorption solvent. Typical solvent to feed ratios in the absorption zone range from about 0.5 to about 3.5 liters of solvent per cubic meter of feed gas (l/$m^3$) at standard conditions, i.e., one atmosphere and 0° C. Quite surprisingly, the absorption solvents have high capacity for mercaptans at low solvent to feed ratios. For example, the capacity for methyl mercaptan removed is preferably from about 90 to 100% of the methyl mercaptan in the feed gas stream at a solvent to feed ratio of less than 1.6 l/$m^3$.

A product gas stream which is at least partially depleted in the mercaptans relative to the feed gas stream is discharged from absorption zone 100 via line 12. Preferably, from about 50 to 100 percent of the methyl mercaptan, from about 20 to 80 percent of the ethyl mercaptan, from about 20 to 85 percent of the propanol mercaptan and from 20 to 90 percent of butyl mercaptan are removed from the feed gas stream in absorption zone 100.

Quite advantageously, the absorption solvent of the present invention also has absorption capacity for $H_2S$ in addition to mercaptans Moreover, the enhanced mercaptan removal capability of the absorption solvents of the present invention does not have an adverse impact on the $H_2S$ removal capability. Accordingly, preferably the product gas stream removed via line 12 is also at least partially i.e., at least 50%, and more preferably largely, i.e., at least 80%, depleted in $H_2S$ relative to the feed gas stream. Also, the absorption solvents of the present invention have high capacity for $CO_2$ as well. Thus, preferably the product gas stream is at least partially depleted in $CO_2$ relative to the feed gas stream.

A rich solvent stream comprising the absorption solvent and at least a portion of the mercaptans is withdrawn from absorption zone 100 via line 13. The rich solvent stream also contains absorbed hydrogen sulfide and carbon dioxide. The rich solvent stream is introduced to a regeneration zone 200 wherein the mercaptans, $H_2S$ and $CO_2$ are desorbed from the absorption solvent. Regeneration zone 200 comprises a distillation/steam stripping tower containing suitable trays or packing material to desorb the absorbed acid gases. Details concerning the apparatus in regeneration zone 200 are known to those skilled in the art. Regeneration zone 200 is typically operated at a temperature from about 100° to 130 ° C. and a pressure from about 100 to 400 kilopascals.

A tail gas stream comprising mercaptans, $CO_2$ and $H_2S$ is discharged from regeneration zone 200 via line 14 and passed to condenser 300. A portion of the condensed tail gas stream is returned to regeneration zone 200 via line 15 and the remainder is removed from the process via line 16.

A regenerated solvent stream comprising the absorption solvent, which is depleted in mercaptans, $H_2S$ and $CO_2$ relative to the rich solvent stream, is withdrawn from regeneration zone 200 via line 17. A portion of the regenerated solvent stream is passed to reboiler 400 and introduced to regeneration zone 200 via line 19. The remainder of the regenerated solvent stream is recycled to absorption zone 100 via line 11 as described previously.

EXAMPLE

The following example is provided for illustrative purposes and is not intended to limit the scope of the claims which follow.

A process such as described above was operated with the three absorption solvents having the compositions set forth below in Table 1. The percent removal of methyl mercaptan for various solvent to feed ratios ("L/G") is also set forth in Table 1. The absorption zone was operated at a temperature of 50° C. and 40° C. for the absorption solvents of the present invention ("Solvent A" and "Solvent B") and 25° C. for the comparative absorption solvent ("Solvent C"). The lower absorption temperature used for the comparative absorption solvent would be expected to enhance the mercaptan removal capability of the comparative absorption solvent as compared to the higher absorption temperature used for the absorption solvents of the present invention.

TABLE 1

| | SOLVENT A | SOLVENT B | SOLVENT C |
|---|---|---|---|
| COMPONENT, WT % | | | |
| Polyethlyene glycol dimethyl ether | 0 | 82.5 | 0 |
| Methoxytriglycol | 31 | 0 | 35 |
| N-Methylethanol-amine | 3 | 8.6 | 0 |
| Methyldiethanol-amine | 9 | 0 | 35 |
| Diethanolamine | 19 | 0 | 0 |
| Water | 38 | 8.9 | 30 |
| METHYL MERCAPTAN REMOVAL, % OF FEED L/G | | | |
| 0.8 | 100 | — | — |
| 1.0 | — | 90 | — |
| 1.6 | — | 86–92 | 74 |
| 1.7 | 94 | — | — |
| 2.5 | — | — | 87 |
| 2.9 | — | — | 92 |
| 3.4 | 100 | 79–90 | — |

The data in Table 1 show that by adding a secondary monoalkanolamine, e.g., N-methylethanolamine, to Solvent A, there was a significant improvement in the removal of methyl mercaptan as compared to Solvent C which did not contain a secondary monoalkanolamine. Similiarly, significant improvements (not shown) were also observed for Solvent A with respect to the removal of ethyl mercaptan, propyl mercaptan and butyl mercaptan, as well as COS as compared to Solvent C. Solvent B provided a higher degree of removal of methyl mercaptan, particularly at low solvent to feed ratios, e.g., L/G of 1.6 and lower, than Solvent C.

Those skilled in the art will recognize that although the invention has been described with respect to specific aspects, other aspects not specifically described herein are intended to be included within the scope of the claims which follow. For example, amines, glycol ethers and additives other than those specifically described herein can be included in the absorption solvents of the present invention. Similarly, process variations such as for example, utilizing multiple absorption zones with separate lean solvent introductions or flashing zones to assist in regenerating the absorption solvent can be employed in the processes of the present invention.

We claim:

1. A process for removing mercaptans having from 1 to about 8 carbon atoms per molecule from a feed gas stream containing the mercaptans, said mercaptans including methyl mercaptan said process comprising:

(a) passing the feed gas stream to an absorption zone wherein the feed gas stream is contacted with a lean solvent stream containing an absorption solvent comprising;

(i) from about 10 to 98 weight percent based on the weight of the absorption solvent on an anhydrous basis of an alkyl ether of a polyethylene glycol of the formula:

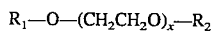

$R_1—O—(CH_2CH_2O)_x—R_2$ wherein;

$R_1$ is an alkyl group having 1 to about 4 carbon atoms;

$R_2$ is hydrogen or an alkyl group having 1 to about 4 carbon atoms; and x is 2 to about 10;

(ii) from 1 to about 20 weight percent based on the weight of the absorption solvent on an anhydrous basis of a secondary monoalkanol amine of the formula:

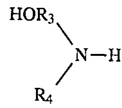

wherein;

$R_3$ is an alkylene group having 1 to about 6 carbon atoms; and $R_4$ is an alkyl group having 1 to about 4 carbon atoms;

(iii) from about 10 to about 60 weight percent of a dialkanol amine based on the weight of the absorption solvent on an anhydrous basis; and (iv) from about 0.1 to 80 weight percent water based on the total weight of the absorption solvent;

said absorption solvent being further characterized by having less than 0.005 moles of iodine per liter of absorption solvent;

(b) discharging a product gas stream at least about 90% depleted in methyl mercaptan relative to the feed gas stream from the absorption zone;

(c) discharging a rich solvent stream comprising the absorption solvent and at least a portion of the mercaptans from the absorption zone;

(d) passing at least a portion of the rich solvent stream to a regeneration zone wherein absorbed mercaptans are desorbed from the rich solvent stream;

(e) discharging a tail gas stream comprising mercaptans from the regeneration zone;

(f) discharging a regenerated solvent stream comprising said absorption solvent; and (g) recycling at least a portion of the regenerated solvent stream to the absorption zone to comprise at least a portion of the lean solvent stream.

2. The process of claim 1 wherein $R_1$ is $CH_3$.

3. The process of claim 1 wherein x is from 2 to 4.

4. The process of claim 1 wherein $R_2$ is hydrogen.

5. The process of claim 1 wherein the alkyl ether of the polyethylene glycol is methoxytriglycol.

6. The process of claim 1 wherein $R_3$ is $CH_2$, $C_2H_4$ or $C_3H_5$.

7. The process of claim 1 wherein $R_4$ is $CH_3$, $C_2H_5$ or $C_3H_7$.

8. The process of claim 1 wherein the secondary monoalkanol amine is N-methylethanolamine.

9. The process of claim 1 wherein the dialkanol amine is selected from the group consisting of diethanolamine, methyldiethanolamine, ethyldiethanolamine, methylethanolpropanolamine, ethylethanolpropanolamine, methyldipropanolamine and mixtures thereof.

10. The process of claim 1 wherein the absorption solvent comprises:

(i) from about 30 to 60 weight percent of the absorption solvent on an anhydrous basis of methoxytriglycol;

(ii) from about 1 to 15 weight percent of the absorption solvent on an anhydrous basis of N-methylethanolamine;

(iii) from about 10 to 40 weight percent of the absorption solvent on an anhydrous basis of said dialkanol amine, said dialkanol amine being diethanolamine;

(iv) from about 5 to 20 weight percent of the absorption solvent on an anhydrous basis of methyldiethanolamine; and (v) from about 0.1 to 80 weight percent water based on the total weight of the absorption solvent.

11. The process of claim 2 wherein $R_2$ is $CH_3$.

12. The process of claim 11 wherein x is from 2 to about 8.

13. The process of claim 11 wherein the alkyl ether of the polyalkylene glycol is polyethylene glycol dimethyl ether.

14. The process of claim 1 wherein the absorption solvent comprises:

(i) from about 50 to 90 weight percent of the absorption solvent on an anhydrous basis of polyethylene glycol dimethyl ether;

(ii) from about 1 to 15 weight percent of the absorption solvent on an anhydrous basis of N-methylethanolamine (iii) from about 0.1 to 80 weight percent water based on the total weight of the absorption solvent.

* * * * *